United States Patent
Zhang et al.

(10) Patent No.: US 11,862,970 B2
(45) Date of Patent: Jan. 2, 2024

(54) DC HOME POWER CONSUMPTION SYSTEM AND WIRING METHOD FOR HOME APPLIANCES BASED ON THE SYSTEM

(71) Applicant: GREE ELECTRIC APPLIANCES, INC. OF ZHUHAI, Zhuhai (CN)

(72) Inventors: Xuefen Zhang, Zhuhai (CN); Zhigang Zhao, Zhuhai (CN); Jinrong Yuan, Zhuhai (CN); Wenqiang Tang, Zhuhai (CN); Chongyang Feng, Zhuhai (CN); Han Liu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 204 days.

(21) Appl. No.: 17/325,537

(22) Filed: May 20, 2021

(65) Prior Publication Data

US 2021/0273449 A1    Sep. 2, 2021

Related U.S. Application Data

(63) Continuation of application No. PCT/CN2019/098490, filed on Jul. 31, 2019.

(30) Foreign Application Priority Data

Oct. 12, 2018  (CN) .......................... 201811192023.1

(51) Int. Cl.
*H02J 1/10*     (2006.01)
*H02J 3/14*     (2006.01)
*G05B 19/042*   (2006.01)

(52) U.S. Cl.
CPC .......... *H02J 1/109* (2020.01); *G05B 19/0421* (2013.01); *H02J 3/144* (2020.01); *G05B 2219/2613* (2013.01); *H02J 2310/14* (2020.01)

(58) Field of Classification Search
CPC .... H02J 1/109; H02J 2310/14; H02J 2310/12; H02J 1/082; H02J 1/084; H02J 1/10; H02J 3/00; G05B 19/0421; G05B 2219/2613

See application file for complete search history.

(56) References Cited

U.S. PATENT DOCUMENTS 9,819,179 B2      11/2017  Nakagawa et al.
2012/0326516 A1*  12/2012  Gurunathan ............... H02J 1/00
                                                         307/43

(Continued)

FOREIGN PATENT DOCUMENTS

CN    102340138 A    2/2012
CN    104682533 A    6/2015

(Continued)

OTHER PUBLICATIONS

Augustine et al., DC Microgrid Protection: Review and Challenges, Sandia Report, Sand2018-8853, Sandia National Laboratories, dated Aug. 31, 2018.

(Continued)

*Primary Examiner* — Lincoln D Donovan
*Assistant Examiner* — Alex W Lam
(74) *Attorney, Agent, or Firm* — Westbridge IP LLC (57) ABSTRACT

The present disclosure discloses a DC home power consumption system and a wiring method for home appliances based on the system. The system includes: a home power supply configured to supply power for the home power consumption system; a high-voltage DC bus connected to the home power supply and configured to supply power for a high-power appliance; a low-voltage DC bus connected to the home power supply or the high-voltage DC bus and configured to supply power for a low-power appliance.

17 Claims, 4 Drawing Sheets

(56) References Cited

U.S. PATENT DOCUMENTS

| | | | | |
|---|---|---|---|---|
| 2015/0022368 A1* | 1/2015 | Smith | .................... | G08B 25/08 |
| | | | | 340/693.3 |
| 2016/0329744 A1* | 11/2016 | Werth | ........................ | H02J 1/10 |
| 2017/0133879 A1* | 5/2017 | Eckhardt | ............ | H02J 13/00004 |
| 2020/0161859 A1* | 5/2020 | Bell | ........................... | H02J 3/14 |
| 2021/0044146 A1 | 2/2021 | Dong et al. | | |
| 2021/0175708 A1* | 6/2021 | Wang | ........................ | H02J 1/14 |

FOREIGN PATENT DOCUMENTS

| | | |
|---|---|---|
| CN | 106451409 A | 2/2017 |
| CN | 108023353 A | 5/2018 |
| CN | 108199376 A | 6/2018 |
| CN | 109274087 A | 1/2019 |
| CN | 209472387 U | 10/2019 |

OTHER PUBLICATIONS

Examination Report No. 1 issued in counterpart Australian Patent Application No. 2019357100, dated Mar. 9, 2022.
Examination Report No. 2 issued in counterpart Australian Patent Application No. 2019357100, dated Jun. 17, 2022.
International Search Report issued in corresponding PCT Application No. PCT/CN2019/098490, dated Nov. 6, 2019.
Written Opinion issued in corresponding PCT Application No. PCT/CN2019/098490, dated Nov. 6, 2019.
Written Opinion issued in counterpart Singapore Patent Application No. 11202105676P, dated Jul. 25, 2022.
Extended European Search Report issued in counterpart European Patent Application No. 19870629.3, dated Oct. 7, 2021.

* cited by examiner

DC HOME POWER CONSUMPTION SYSTEM AND WIRING METHOD FOR HOME APPLIANCES BASED ON THE SYSTEM

CROSS-REFERENCE TO RELATED APPLICATIONS

This application is a continuation of International Application No. PCT/CN2019/098490 filed on Jul. 31, 2019, which claims priority to Chinese patent application No. 201811192023.1 filed on Oct. 12, 2018. Both applications are incorporated herein by reference in their entireties.

TECHNICAL FIELD

The present disclosure relates to direct current (DC) home technical field, in particular, relates to a DC home power consumption system and a wiring method for home appliances based on the system.

BACKGROUND

With the rapid development of DC application, DC home, DC buildings, and DC appliances have gradually become hot topics in various industries in recent years. The differences in power level, working voltage, and so on, of DC appliances causes that the DC home and the DC buildings have multiple DC voltages. Wiring of the entire system is complex and thus easily leads to intersection and interference of strong and weak electricity, etc.

Regarding to the complexity and poor security of DC home wiring in related technologies, no effective solutions have been proposed yet.

SUMMARY

The present disclosure provides a DC home power consumption system and a wiring method for home appliances based on the system, so as to at least solve the problems of complexity and poor security of DC home wiring in the prior art.

In order to solve the above technical problems, according to one of the embodiments of the present disclosure, a DC home power consumption system is provided, including: a home power supply configured to supply power for the home power consumption system; a high-voltage DC bus connected to the home power supply and configured to supply power for a high-power appliance; and a low-voltage DC bus connected to the home power supply or the high-voltage DC bus and configured to supply power for a low-power appliance.

Further, the home power supply is a DC grid or a non-DC grid; the non-DC grid includes at least one of the following: an alternating current (AC) power grid, a new energy resource and an energy storage device.

Further, when the home power supply is the DC grid, the high-voltage DC bus is directly connected to the DC grid, and the low-voltage DC bus is connected to the high-voltage DC bus; when the home power supply is the non-DC grid, the high-voltage DC bus is connected to the non-DC grid through an energy router, and the low-voltage DC bus is connected to the energy router or the high-voltage DC bus.

Further, the low-voltage DC bus is connected to the energy router or the high-voltage DC bus, includes: it is determined that the low-voltage DC bus is connected to the energy router or the high-voltage DC bus according to an output capability of the low-voltage DC bus and/or an output line of the energy router.

Further, the output capability of the low-voltage DC bus is a transmission capability of the low-voltage DC bus or a transmission distance of the low-voltage DC bus; the output capability of the low-voltage DC bus includes meeting a low-voltage home requirement or not meeting a low-voltage home requirement; the output line of the energy router includes a high-voltage DC line or a high-voltage DC line and a low-voltage DC line.

Further, when the output capability of the low-voltage DC bus meets the low-voltage home requirement, and the output line of the energy router includes the high-voltage DC line and the low-voltage DC line, the low-voltage DC bus is connected to the energy router through the low-voltage DC line; when the output capability of the low-voltage DC bus does not meet the low-voltage home requirement, or the output line of the energy router is the high-voltage DC line, the low-voltage DC bus is connected to the high-voltage DC bus; and the high-voltage DC bus is connected to the high-voltage DC line.

Further, the low-voltage DC bus is divided into different low-voltage bus areas according to a use area, and when the low-voltage DC bus is connected to the high-voltage DC bus, each of the low-voltage bus areas is connected to the high-voltage DC bus through a DC converter.

Further, the high-voltage DC bus is located in an upper part of the home space, and the low-voltage DC bus is located in a lower part of the home space.

Further, voltages of the high-voltage DC bus and the low-voltage DC bus are determined according to an area where the home power consumption system is located.

According to one of the embodiments of the present disclosure, a wiring method for home appliances is provided based on the DC home power consumption system, includes: obtaining electricity parameters of each of the home appliances; connecting the home appliance to the high-voltage DC bus or the low-voltage DC bus according to the electricity parameters of the home appliance.

Further, the electricity parameters at least include: power, a usage frequency, and a user requirement.

Further, a priority of the electricity parameters is: a priority of the power>a priority of the usage frequency>a priority of the user requirements; the connecting the home appliance to the high-voltage DC bus or the low-voltage DC bus according to the electricity parameters of the home appliance includes: connecting the home appliance to the high-voltage DC bus or the low-voltage DC bus according to the priority of the electricity parameters of the home appliance.

Further, the connecting the home appliance to the high-voltage DC bus or the low-voltage DC bus according to the priority of the electricity parameters of the home appliance includes: connecting the home appliance to the high-voltage DC bus or the low-voltage DC bus according to the power of the home appliance, including: connecting the home appliance to the high-voltage DC bus when the power of the home appliance is greater than a first preset power; connecting the home appliance to the low-voltage DC bus when the power of the home appliance is less than a second preset power; and connecting the home appliance to the high-voltage DC bus or the low-voltage DC bus according to the usage frequency of the home appliance, when the power of the home appliance is less than or equal to the first preset power and greater than or equal to the second preset power.

Further, according to the usage frequency of the home appliance, the home appliance is divided into different using areas, and the using areas include at least one of the following: a bedroom area, a living room area, a study area, a dining area, a bathroom area, and a kitchen area. The bedroom area, the living room area, the study area, and the dining room area are frequent activity areas; and the bathroom area and the kitchen area are living functional areas.

Further, the connecting the home appliance to the high-voltage DC bus or the low-voltage DC bus according to the usage frequency of the home appliance includes: connecting the home appliance to the low-voltage DC bus when the home appliance is in a frequent activity area; and connecting the home appliance to the high-voltage DC bus or the low-voltage DC bus according to the use requirement of the home appliance, when the home appliance is in a living function area.

Further, the connecting the home appliance to the high-voltage DC bus or the low-voltage DC bus according to the use requirement of the home appliance includes: connecting the home appliance to the high-voltage DC bus when the use requirement is to be located in an upper part of a home environment; and connecting the home appliance to the low-voltage DC bus when the use requirement is to be located in a lower part of the home environment.

A computer device is provided according to one of the embodiments of the present disclosure, including: a memory, a processor, and a computer program stored in the memory and run on the processor. The processor executes the computer program to implementing a wiring method for home appliances as described hereinabove.

A storage medium containing computer-executable instructions is provided according to one of the embodiments of the present disclosure, the computer-executable instructions are configured to perform a wiring method for home appliances as described hereinabove when executed by a computer processor.

In the present disclosure, a full-DC home power consumption system and a wiring method for home appliances are proposed, which greatly reduces the DC home voltage level, and form a basic DC home wiring principle according to a concept of high and low voltage partitions and DC appliance application partitions, to ensure safety and reliability of using electricity of the DC home appliances.

DETAILED DESCRIPTION OF THE EMBODIMENTS

Exemplary embodiments will be described in detail herein, and the examples thereof are shown in the accompanying drawings. When the following description refers to the drawings, unless otherwise indicated, the same numbers in different accompanying drawings denote the same or similar element. The implementations described in the following exemplary embodiments do not represent all implementations consistent with the present disclosure. On the contrary, they are merely examples of devices and methods consistent with some aspects of the present disclosure as detailed in the appended claims.

Embodiment 1

Figure 1:
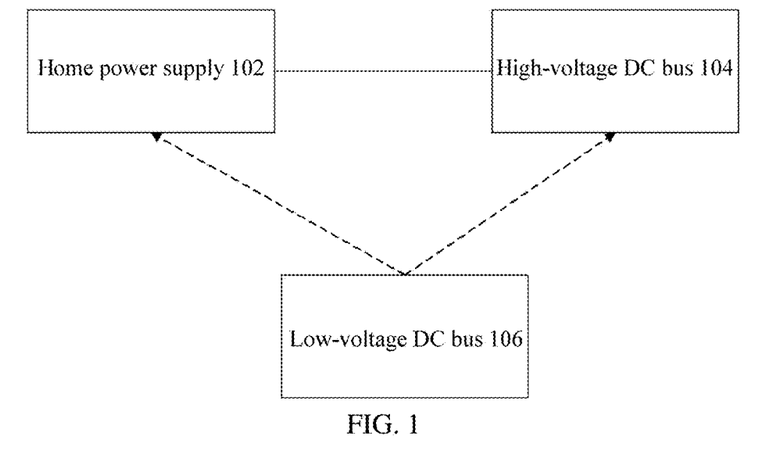
FIG. 1 is an optional structural block diagram of a DC home power consumption system according to an embodiment of the present disclosure.

In the preferred embodiment 1 of the present disclosure, a DC home power consumption system is provided. Specifically, FIG. 1 shows an optional structural block diagram of the system, as shown in FIG. 1, and the system includes:
  a home power supply 102 which is configured to supply power for the home power consumption system;
  a high-voltage DC bus 104 which is connected to the home power supply 102 and configured to supply power for a high-power appliance;
  a low-voltage DC bus 106 which is connected to the home power supply 102 or the high-voltage DC bus 104 and configured to supply power for a low-power appliance.

The high-power appliance is optionally an appliance of which power is greater than the first preset power, and the low-power appliance is optionally an appliance of which power is less than the second preset power.

In the above embodiments, a full DC home power consumption system is proposed, which greatly reduces the DC home voltage level, and forms a basic DC home wiring principle according to a concept of high and low voltage partitions and DC appliance application partitions, to ensure safety and reliability of using electricity of the DC home appliances.

In a preferred embodiment of the present disclosure, the home power supply is a DC grid or a non-DC grid; the non-DC grid includes at least one of the following: an AC power grid, a new energy resource and an energy storage device.

When the home power supply is the DC grid, the high-voltage DC bus is directly connected to the DC grid, and the low-voltage DC bus is connected to the high-voltage DC bus. When the home power supply is the non-DC grid, the high-voltage DC bus is connected to the non-DC grid through an energy router, and the low-voltage DC bus is connected to the energy router or the high-voltage DC bus.

Figure 2:
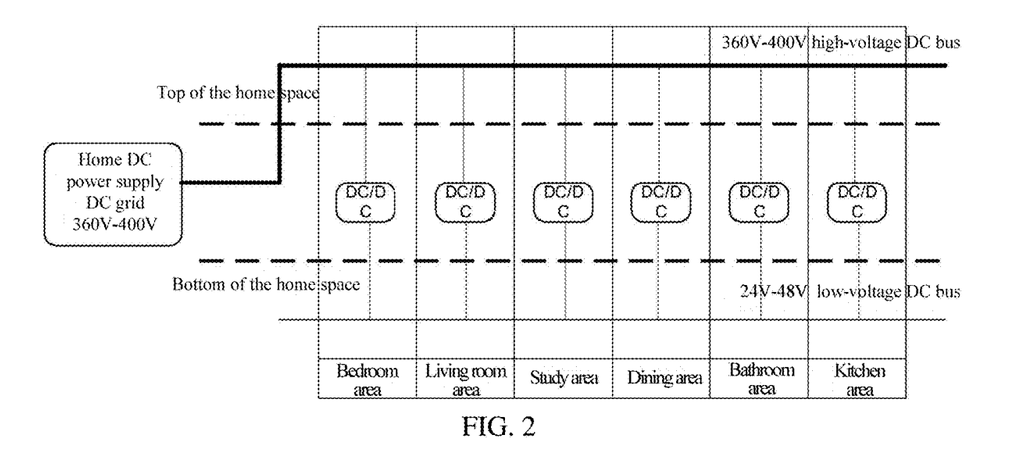
FIG. 2 is an optional structural block diagram of a distributed full DC home system according to an embodiment of the present disclosure.

When the home power supply is the DC grid, the DC home power consumption system, as shown in FIG. 2, is a distributed full DC home system, the home DC power supply is a 360V-400V DC power supply provided by the DC grid directly, and the low-voltage DC bus is connect to the high voltage DC bus through a DC convertor.

Figure 3:
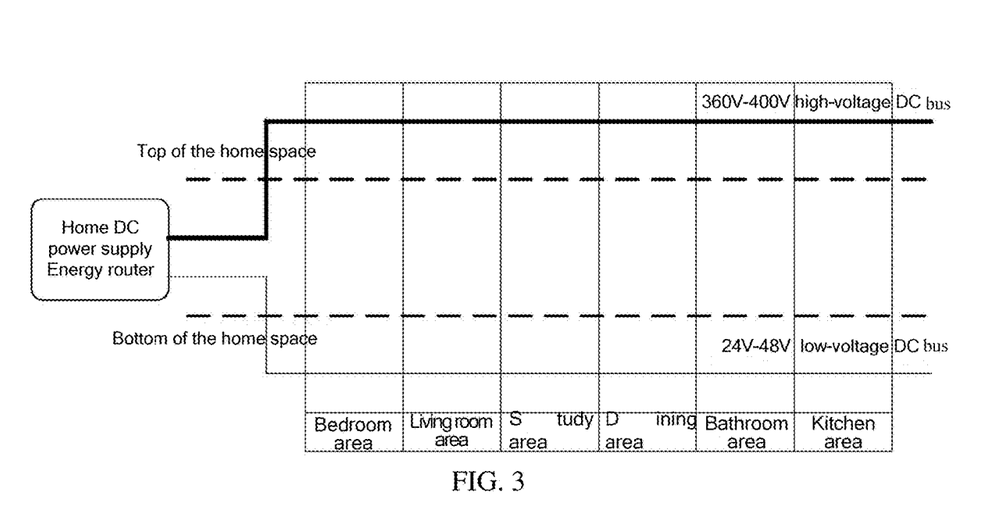
FIG. 3 is an optional structural block diagram of a centralized full DC home system according to an embodiment of the present disclosure.
Figure 4:
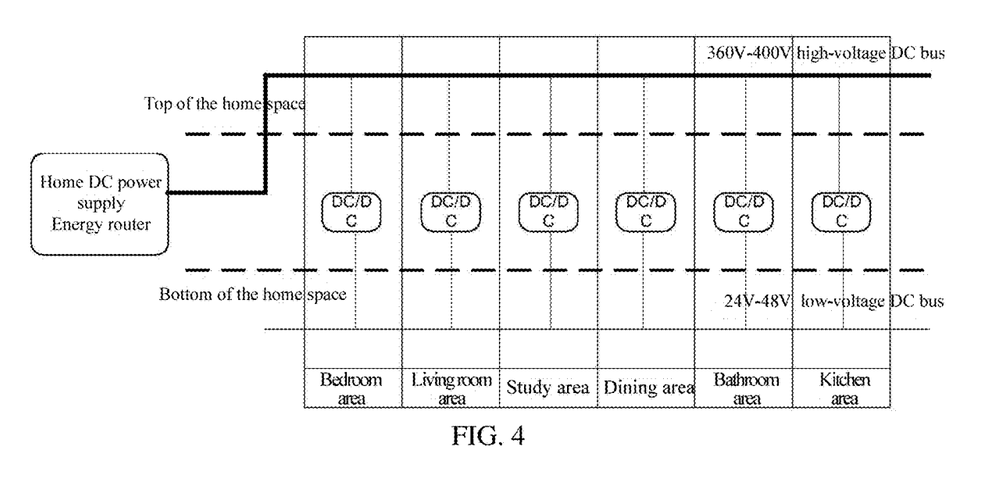
FIG. 4 is an optional structural block diagram of a centralized-distributed full DC home system according to an embodiment of the present disclosure.

Further, that the low-voltage DC bus is connected to the energy router or the high-voltage DC bus includes: it is determined that the low-voltage DC bus is connected to the energy router or the high-voltage DC bus according to an output capability of the low-voltage DC bus and/or an output line of the energy router. The output capability of the low-voltage DC bus is a transmission capability of the low-voltage DC bus or a transmission distance of the low-voltage DC bus. The output capability of the low-voltage DC bus includes meeting a low-voltage home requirement or not meeting a low-voltage home requirement. The output line of the energy router includes a high-voltage DC line or a high-voltage DC line and a low-voltage DC line. When the output capability of the low-voltage DC bus meets a low-voltage home requirement, and the output line of the energy router includes the high-voltage DC line and the low-voltage DC line, the low-voltage DC bus is connected to the energy router through the low-voltage DC line. As shown in FIG. 3, it is a centralized full DC home system, and the home DC power supply may be an AC grid/a new energy plus an energy router, or a DC grid plus an energy router; when the output capability of the low-voltage DC bus does not meet the low-voltage home requirement, or the output line of the energy router is the high-voltage DC line, the low-voltage DC bus is connected to the high-voltage DC bus; the high-voltage DC bus is connected to the high-voltage DC line. Further, the low-voltage DC bus is divided into different low-voltage bus areas according to a use area, and when the low-voltage DC bus is connected to the high-voltage DC bus, each of the low-voltage bus areas is connected to the high-voltage DC bus through a DC converter. As shown in FIG. 4, it is a centralized-distributed full DC home system, and the home DC power supply may be an AC grid/a new energy plus an energy router, or a DC grid and an energy router.

The low-voltage DC bus is divided into different low-voltage bus areas according to a use area, and when the low-voltage DC bus is connected to the high-voltage DC bus, each of the low-voltage bus areas is connected to the high-voltage DC bus through a DC converter.

Further, the high-voltage DC bus is located in an upper part of the home space, and the low-voltage DC bus is located in a lower part of the home space. Voltages of the high-voltage DC bus and the low-voltage DC bus are determined according to an area where the home power system is located.

The basic architecture of the three kinds of full DC home power consumption systems adopts a basic thought of high and low voltage safety isolation. The high voltage has a range from 360V to 400V (according to actual application scenarios or national standards); the safe low voltage has a value 48V/24V (according to actual application scenarios or national standard implementation). The basic architecture reduces the multiple DC voltages of the full DC home power consumption system to a high-voltage and a safe low-voltage. At the same time, according to the architecture and daily application habits of an appliance, it is recommended to locate the high-voltage wiring in a upper part of the home space when wiring for the home; it is convenient to use that the safe low-voltage wiring is located in the lower part of the home space; at the same time, the space isolation of high and low voltage is realized to ensure the safety and reliability of the overall home electricity.

Embodiment 2

Figure 5:
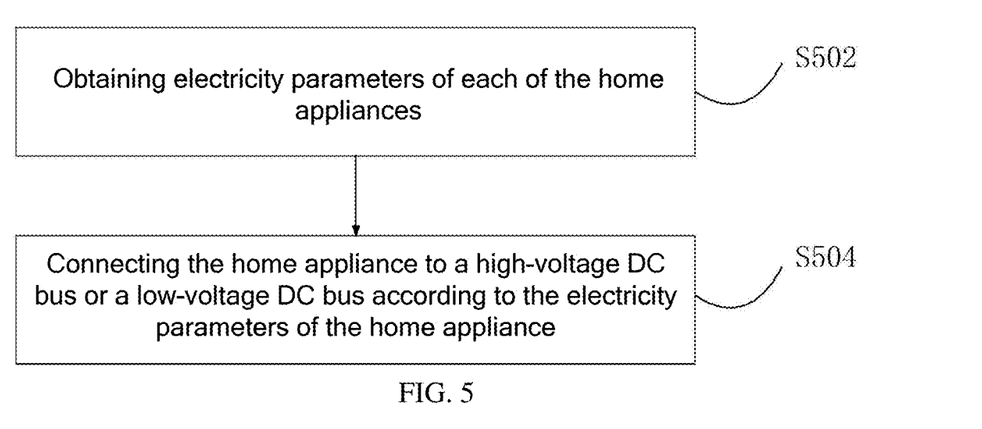
FIG. 5 is an optional flowchart of a wiring method for home appliances according to an embodiment of the present disclosure.

According to the system provided in the above embodiment 1, a preferred embodiment 2 of the present disclosure also provides a wiring method for home appliances. The wiring method may be directly applied to the system described above. Specifically, FIG. 5 shows an optional flow chart of the method, and as shown in FIG. 5, the method includes the following steps S502-S504:

Step 502: obtaining electricity parameters of each of the home appliances;

Step 504: connecting the home appliance to a high-voltage DC bus or a low-voltage DC bus according to the electricity parameters of the home appliance.

In the above embodiment, a wiring method for home appliances is proposed, which greatly reduces the DC home voltage level, and forms a basic DC home wiring principle according to a concept of high and low voltage partitions and DC appliance application partitions, to solve safety and reliability of using electricity of the DC home appliances.

The electricity parameters at least includes: power, a usage frequency, and a user requirement. A priority of the electricity parameters is: a priority of the power>a priority of the usage frequency>a priority of the user requirement; and the connecting home appliance to a high-voltage DC bus or a low-voltage DC bus according to the electricity parameters of the home appliance, includes: connecting the home appliance to the high-voltage DC bus or the low-voltage DC bus according to the priority of the electricity parameters of the home appliance.

Preferably, the connecting the home appliance to the high-voltage DC bus or the low-voltage DC bus according to the priority of the electricity parameters of the home appliance, includes: connecting the home appliance to the high-voltage DC bus or the low-voltage DC bus according to the power of the home appliance, including: connecting the home appliance to the high-voltage DC bus when the power of the home appliance is greater than a first preset power; connecting the home appliance to the low-voltage DC bus when the power of the home appliance is less than a second preset power; and connecting the home appliance to the high-voltage DC bus or the low-voltage DC bus according to the usage frequency of the home appliance when the power of the home appliance is less than or equal to the first preset power and greater than or equal to the second preset power.

Further, according to the usage frequency of the home appliance, the home appliance is divided into different using areas, and the using areas include at least one of the following: a bedroom area, a living room area, a study area, a dining area, a bathroom area, and a kitchen area, The bedroom area, the living room area, the study area, and the dining area are frequent activity areas; and the bathroom area and the kitchen area are living functional areas. The connecting the home appliance to the high-voltage DC bus or the low-voltage DC bus according to the usage frequency of the home appliance, includes: connecting the home appliance to the low-voltage DC bus when the home appliance is in a frequent activity area; and connecting the home appliance to the high-voltage DC bus or the low-voltage DC bus according to the use requirement of the home appliance, when the home appliance is in a living function area.

Preferably, the connecting the home appliance to the high-voltage DC bus or the low-voltage DC bus according to the use requirement of the home appliance, includes: connecting the home appliance to the high-voltage DC bus when the use requirement is to be located in an upper part of a home environment; and connecting the home appliance to the low-voltage DC bus when the use requirement is to be located in a lower part of the home environment.

Figure 6:
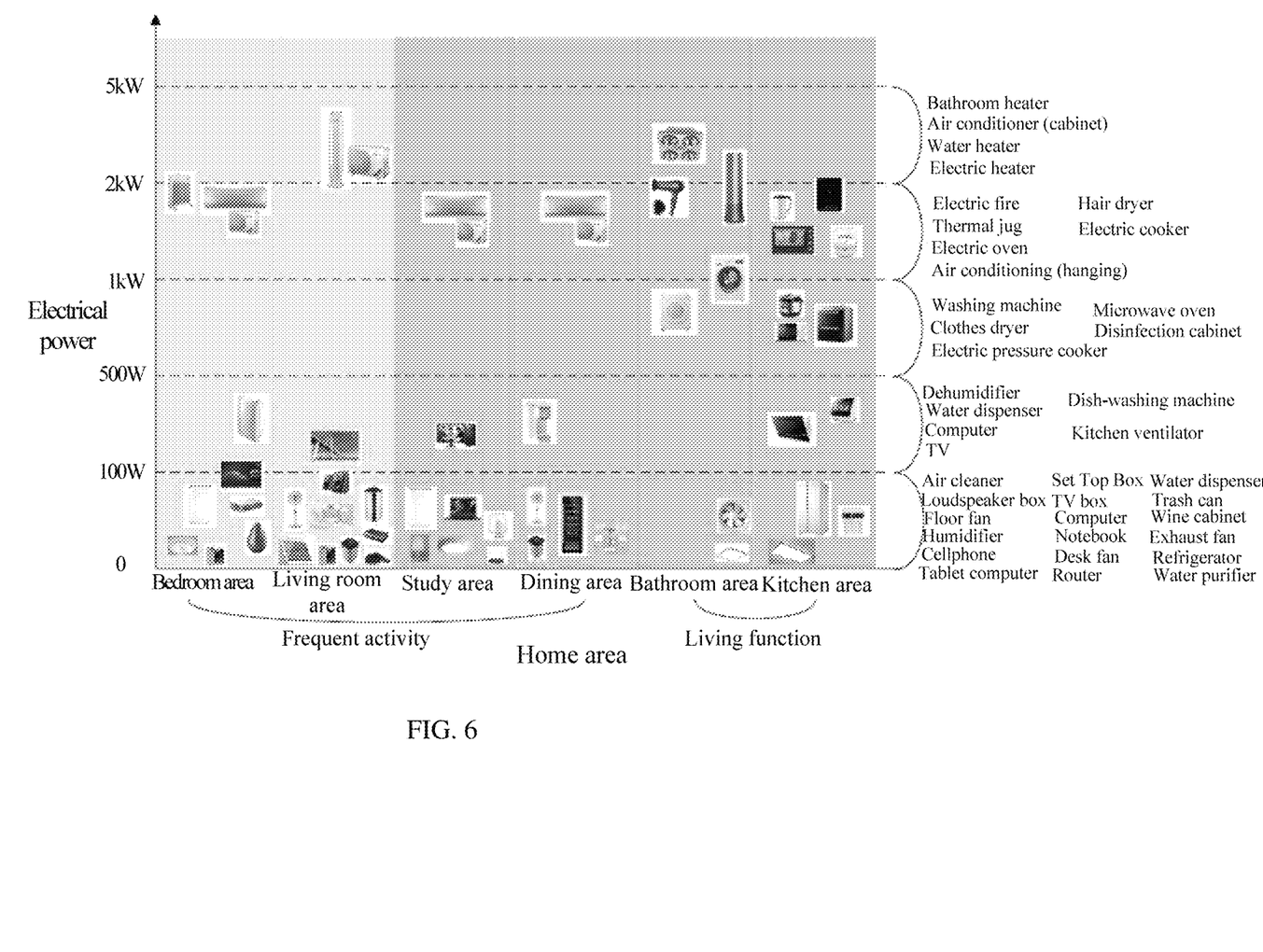
FIG. 6 is an optional schematic diagram of home appliances distribution in home areas according to an embodiment of the present disclosure.

According to the usage area and habits, the home DC appliances are evaluated from the three dimensions of power, voltage, and usage area, and the distribution diagram of the DC appliances in the full DC home application environment is determined as shown in FIG. 6. In frequent activities areas, such as, a bedroom area, a living room area, a study area, a dining area and so on, DC appliances are often configured as low-power, safe low-voltage and removable at any time. Additionally, air conditioners involved in frequent activity areas are installed in the upper part of the home environment according to the installation location and electricity requirements, in order to realize isolated from voltage level and physical space and ensure electricity safety. In living function areas, such as a bathing area and a kitchen area, DC appliances usually have a slightly higher power level, high-voltage DC bus or low-voltage DC bus should be selected reasonably according to the electricity requirements, and wiring design should be carried out according to the principle of high and low voltage partition.

Embodiment 3

In a preferred embodiment 3 of the present disclosure, a computer device is provided based on the wiring method for the home appliances provided in the above-mentioned embodiment 2, including: a memory, a processor, and a computer program stored in the memory and run on the processor. The processor executes the computer program to implementing the wiring method for home appliances as described above.

In the above embodiments, a wiring method for home appliances is proposed, which greatly reduces the DC home voltage level, and forms a basic DC home wiring principle according to a concept of high and low voltage partitions and DC appliance application partitions, to ensure safety and reliability of using electricity of the DC home appliances.

Embodiment 4

In a preferred embodiment 4 of the present disclosure, a storage medium containing computer-executable instructions is provided based on the wiring method for the home appliances provided in the above-mentioned embodiment 2, and the computer-executable instructions are configured to perform the wiring method for the home appliances as described above.

In the above embodiments, a wiring method for home appliances is proposed, which greatly reduces the DC home voltage level, and forms a basic DC home wiring principle according to a concept of high and low voltage partitions and DC electrical application partitions, to ensure safety and reliability of using electricity of the DC home appliances.

Those skilled in the art can easily implement the rest of embodiments of the present disclosure after considering the detailed description and practicing the invention disclosed herein. The present disclosure is intended to cover any variations, uses, or adaptive changes of the present disclosure. These variations, uses, or adaptive changes follow the general principles of the present disclosure and include common knowledge or conventional technical skills in the technical field not invented by the present disclosure. The detailed description and embodiments are merely regarded as exemplary, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is merely limited by the accompanying claims.

What is claimed is:

1. A direct current (DC) home power consumption system, comprising:
a home power supply, configured to supply power for the home power consumption system;
a high-voltage DC bus, connected to the home power supply and configured to supply power for a high-power appliance; and
a low-voltage DC bus, connected to the home power supply or the high-voltage DC bus and configured to supply power for a low-power appliance,
wherein the high-voltage DC bus is configured to be located in an upper part of a home space, and the low-voltage DC bus is configured to be located in a lower part of the home space for realizing space isolation of high and low voltage to ensure safety and reliability of overall home electricity,
wherein the high-voltage DC bus is configured to supply power for a high-power appliance and the low-voltage DC bus is configured to supply power for a low-power appliance according to a priority of electricity parameters of a home appliance, the electricity parameters at least comprise: power, a usage frequency and a user requirement, and the priority of the electricity parameters is: a priority of the power>a priority of the usage frequency>a priority of the user requirement.

2. The DC home power consumption system of claim 1, wherein the home power supply is a DC grid or a non-DC grid; the non-DC grid comprises at least one of the following: an alternating current (AC) power grid, a new energy resource and an energy storage device.

3. The DC home power consumption system of claim 2, wherein when the home power supply is the DC grid, the high-voltage DC bus is directly connected to the DC grid, and the low-voltage DC bus is connected to the high-voltage DC bus; when the home power supply is the non-DC grid, the high-voltage DC bus is connected to the non-DC grid through an energy router, and the low-voltage DC bus is connected to the energy router or the high-voltage DC bus.

4. The DC home power consumption system of claim 3, wherein the low-voltage DC bus is connected to the energy router or the high-voltage DC bus according to an output capability of the low-voltage DC bus and/or an output line of the energy router.

5. The DC home power consumption system of claim 4, wherein the output capability of the low-voltage DC bus is a transmission capability of the low-voltage DC bus or a transmission distance of the low-voltage DC bus; the output capability of the low-voltage DC bus comprises meeting a low-voltage home requirement or not meeting a low-voltage home requirement; the output line of the energy router comprises a high-voltage DC line or a high-voltage DC line and a low-voltage DC line.

6. The DC home power consumption system of claim 5, wherein when the output capability of the low-voltage DC bus meets the low-voltage home requirement, and the output line of the energy router comprises the high-voltage DC line and the low-voltage DC line, the low-voltage DC bus is connected to the energy router through the low-voltage DC line; when the output capability of the low-voltage DC bus does not meet the low-voltage home requirement, or the output line of the energy router is the high-voltage DC line, the low-voltage DC bus is connected to the high-voltage DC bus; and the high-voltage DC bus is connected to the high-voltage DC line.

7. The DC home power consumption system of claim 6, wherein the low-voltage DC bus is divided into different low-voltage bus areas according to a use area, and when the low-voltage DC bus is connected to the high-voltage DC bus, each of the low-voltage bus areas is connected to the high-voltage DC bus through a DC converter.

8. The DC home power consumption system of claim 1, wherein voltages of the high-voltage DC bus and the low-voltage DC bus are determined according to an area where the home power consumption system is located.

9. The DC home power consumption system of claim 1, wherein the high-power appliance is an appliance of which power is greater than a first preset power.

10. The DC home power consumption system of claim 1, wherein the low-power appliance is an appliance of which power is less than a second preset power.

11. A wiring method for home appliances, based on the direct current (DC) home power consumption system according to claim 1, comprising:
obtaining electricity parameters of each of the home appliances; and
connecting the home appliance to a high-voltage DC bus or a low-voltage DC bus according to the electricity parameters of the home appliance,
wherein the electricity parameters at least comprise: power, a usage frequency and a user requirement,
a priority of the electricity parameters is: a priority of the power>a priority of the usage frequency>a priority of the user requirement; and
the connecting the home appliance to a high-voltage DC bus or a low-voltage DC bus according to the electricity parameters of the home appliance, comprises:
connecting the home appliance to the high-voltage DC bus or the low-voltage DC bus according to the priority of the electricity parameters of the home appliance.

12. The wiring method of claim 11, wherein the connecting the home appliance to the high-voltage DC bus or the low-voltage DC bus according to the priority of the electricity parameters of the home appliance, comprises:
connecting the home appliance to the high-voltage DC bus or the low-voltage DC bus according to the power of the home appliance, comprising: connecting the home appliance to the high-voltage DC bus when the power of the home appliance is greater than a first preset power; connecting the home appliance to the low-voltage DC bus when the power of the home appliance is less than a second preset power; and connecting the home appliance to the high-voltage DC bus or the low-voltage DC bus according to the usage frequency of the home appliance, when the power of the home appliance is less than or equal to the first preset power and greater than or equal to the second preset power.

13. The wiring method of claim 12, wherein the home appliance is divided into different using areas according to the usage frequency of the home appliance, and the using areas comprise at least one of the following: a bedroom area, a living room area, a study area, a dining area, a bathroom area, and a kitchen area; wherein the bedroom area, the living room area, the study area, and the dining area are frequent activity areas; the bathroom area and the kitchen area are living functional areas.

14. The wiring method of claim 13, wherein the connecting the home appliance to the high-voltage DC bus or the low-voltage DC bus according to the usage frequency of the home appliance, comprises:
connecting the home appliance to the low-voltage DC bus when the home appliance is in a frequent activity area; and
connecting the home appliance to the high-voltage DC bus or the low-voltage DC bus according to the use requirement of the home appliance, when the home appliance is in a living function area.

15. The wiring method of claim 14, wherein the connecting the home appliance to the high-voltage DC bus or the low-voltage DC bus according to the use requirement of the home appliance, comprises:
connecting the home appliance to the high-voltage DC bus when the use requirement is to be located in an upper part of a home environment; and
connecting the home appliance to the low-voltage DC bus when the use requirement is to be located in a lower part of the home environment.

16. A computer device, comprising:
a memory, a processor, and a computer program stored in the memory and run on the processor, wherein the processor executes the computer program to implement the wiring method for home appliances according to claim 11.

17. A non-transitory storage medium containing computer-executable instructions, wherein the computer-executable instructions are configured to perform the wiring method for home appliances according to claim 11 when executed by a computer processor.

* * * * *